(12) United States Patent
Ji et al.

(10) Patent No.: US 9,958,035 B2
(45) Date of Patent: May 1, 2018

(54) PLANETARY GEAR TRAIN OF AUTOMATIC TRANSMISSION FOR VEHICLES

(71) Applicant: Hyundai Motor Company, Seoul (KR)

(72) Inventors: Seongwook Ji, Gunpo-si (KR); Sueng Ho Lee, Seoul (KR); Jae Chang Kook, Hwaseong-si (KR); Dong Hwan Hwang, Seoul (KR); SeokJin Kim, Hwaseong-si (KR); Wonmin Cho, Hwaseong-si (KR); Hyun Sik Kwon, Seoul (KR); Jong Sool Park, Hwaseong-si (KR); Kyeong Hun Lee, Seoul (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/248,563

(22) Filed: Aug. 26, 2016

(65) Prior Publication Data

US 2017/0159769 A1 Jun. 8, 2017

(30) Foreign Application Priority Data

Dec. 2, 2015 (KR) .................. 10-2015-0170990

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0065* (2013.01);
(Continued)

(58) Field of Classification Search
CPC ............... F16H 3/66; F16H 2200/2097; F16H 2200/2046; F16H 2200/0065; F16H 2200/2012
(Continued)

(56) References Cited

U.S. PATENT DOCUMENTS

| 2008/0039267 A1* | 2/2008 | Shim ................... F16H 3/66 475/280 |
| 2008/0108473 A1* | 5/2008 | Shim ................... F16H 3/66 475/276 |

(Continued)

FOREIGN PATENT DOCUMENTS

| JP | 2006-349153 A | 12/2006 |
| KR | 1020120133578 A | 12/2012 |
| WO | WO 2013/088900 A1 | 6/2013 |

*Primary Examiner* — Roger L Pang
(74) *Attorney, Agent, or Firm* — Morgan, Lewis & Bockius LLP

(57) ABSTRACT

A planetary gear train of an automatic transmission for a vehicle, the planetary gear train may include an input shaft receiving power from an engine, an output shaft outputting shifted power of the engine, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, and six control elements which are disposed at positions where at least one of the rotating elements is selectively connectable with another of the rotating elements or disposed at positions where rotating elements are selectively connectable to a transmission housing.

8 Claims, 1 Drawing Sheet

(52) U.S. Cl.
CPC ........... *F16H 2200/2012* (2013.01); *F16H 2200/2046* (2013.01); *F16H 2200/2097* (2013.01)

(58) Field of Classification Search
USPC .......................................... 475/275–291, 330
See application file for complete search history.

(56) References Cited

U.S. PATENT DOCUMENTS

| | | | |
|---|---|---|---|
| 2008/0108474 A1* | 5/2008 | Seo ................. | F16H 3/663 475/284 |
| 2015/0087472 A1 | 3/2015 | Beck et al. | |
| 2016/0319913 A1* | 11/2016 | Park ................. | F16H 3/66 |
| 2017/0114868 A1* | 4/2017 | Hwang ............. | F16H 3/66 |
| 2017/0159772 A1* | 6/2017 | Cho ................. | F16H 3/66 |

* cited by examiner

| speed shift stage | control element for gear shift operation | | | | | | gear ratio | ratio between gear shift stages | span of gear ratio |
|---|---|---|---|---|---|---|---|---|---|
| | C1 | C2 | C3 | C4 | B1 | B2 | | | |
| D1 | | | ● | ● | | ● | 5.439 | | |
| D2 | ● | | ● | | | ● | 3.302 | 1.647 | |
| D3 | ● | | | ● | | ● | 2.148 | 1.538 | |
| D4 | ● | ● | | | | ● | 1.617 | 1.328 | |
| D5 | ● | ● | | ● | | | 1.245 | 1.299 | 9.1 |
| D6 | ● | ● | ● | | | | 1.000 | 1.245 | |
| D7 | | ● | ● | ● | | | 0.847 | 1.144 | |
| D8 | | ● | ● | | ● | | 0.732 | 1.194 | |
| D9 | | ● | | ● | ● | | 0.599 | 1.223 | |
| REV | | | | ● | ● | ● | -3.973 | | |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0170990, Dec. 2, 2015, the entire contents of which is incorporated herein for all purposes by this reference.

BACKGROUND OF THE INVENTION

Field of the Invention

The present invention relates to an automatic transmission for a vehicle, and more particularly, to a planetary gear train of an automatic transmission for a vehicle, which is capable of implementing nine forward speeds using a minimum number of components, improving power transmission performance and fuel efficiency by increasing a span of a gear shift ratio, and ensuring linearity of ratios between gear shift stages.

Description of Related Art

Recent increases in oil prices are triggering stiff competition among auto-makers in enhancing fuel consumption of a vehicle.

Therefore, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

However, in the case of the automatic transmission, the number of internal components increases as the number of gear shift stages is increased, which may deteriorate installability, production cost, weight and/or power flow efficiency.

Accordingly, development of a planetary gear train which may bring about maximum efficiency with a small number of components is important in order to increase a fuel efficiency enhancement effect through the multiple speed stages.

In this aspect, in recent years, 8-speed automatic transmissions tend to be implemented and the research and development of a planetary gear train capable of implementing more speed stages has also been actively conducted.

However, in the case of the recent 8-speed automatic transmission, since a span of a shift ratio is maintained to a level of 6.5 to 7.5, the 8-speed automatic transmission does not have a great effect of improving the fuel efficiency.

In addition, in the case in which the span of the shift ratio of the 8-speed automatic transmission is set to a level of 9.0 or more, since linearity of an interstage ratio of a shift stage may not be secured, running efficiency of the engine and drivability of the vehicle are degraded.

Therefore, there is a need to develop a high efficient automatic transmission of at least 9-speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for vehicles having advantages of improving power transfer performance and fuel efficiency and securing linearity of an interstage part of a shift stage by increasing a span of a shift ratio while implementing a shift stage of advance 9-speed and reverse 1-speed by a minimum configuration.

According to various aspects of the present invention, a planetary gear train of an automatic transmission for a vehicle may include an input shaft receiving power from an engine, an output shaft outputting shifted power of the engine, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, and six control elements which are disposed at positions where at least one of the rotating elements may be selectively connectable with another of the rotating elements or disposed at positions where rotating elements are selectively connectable to a transmission housing, in which the input shaft may be directly connected to the first rotation element, the output shaft may be directly connected to the eighth rotation element, the third rotation element may be directly connected to the fifth rotation element, the fourth rotation element may be directly connected to the transmission housing, the eighth rotation element may be directly connected to the twelfth rotation element, and the ninth rotation element may be directly connected to the eleventh rotation element.

At least one of the second rotation element and the seventh rotation element may be selectively connectable to the transmission housing, the second rotation element may be selectively connectable to the input shaft, the eleventh rotation element may be selectively connectable to the input shaft, the second rotation element may be selectively connectable to the tenth rotation element, and the sixth rotation element may be selectively connectable to the tenth rotation element.

The first, second, and third rotation elements may be a sun gear, a planet carrier, and a ring gear, respectively, the fourth, fifth, and sixth rotation elements may be a sun gear, a planet carrier, and a ring gear, respectively, the seventh, eighth, and ninth rotation elements may be a sun gear, a planet carrier, and a ring gear, respectively, and the tenth, eleventh, and twelfth rotation elements may be a sun gear, a planet carrier, and a ring gear, respectively.

According to various aspects of the present invention, a planetary gear train of an automatic transmission for vehicles may include an input shaft receiving power of an engine, an output shaft outputting shifted power of the engine, a first planetary gear set having first, second, and third rotation elements, a second planetary gear set having fourth, fifth, and sixth rotation elements, a third planetary gear set having seventh, eighth, and ninth rotation elements, a fourth planetary gear set having tenth, eleventh, and twelfth rotation elements, six control elements disposed at positions to selectively connect the rotation elements or at positions to selectively connect at least one of the rotation elements and a transmission housing, a first rotational shaft including the first rotation element and directly connected to the input shaft, a second rotational shaft including the second rotation element and selectively connectable to the transmission housing, a third rotational shaft including the third rotation element and the fifth rotation element, a fourth rotational shaft including the fourth rotation element and directly connected to the transmission housing, a fifth rotational shaft including the sixth rotation element, a sixth rotational shaft including the seventh rotation element and selectively connectable to the transmission housing, a seventh rotational shaft including the eighth rotation element and the twelfth rotation element, and directly connected to the output shaft, an eighth rotational shaft including the ninth rotation element and the eleventh rotation element, and selectively connectable to the input shaft, and a ninth rotational shaft including the tenth rotation element, and selectively connectable to at least one of the second rotational shaft and the fifth rotational shaft.

The first planetary gear set may be a single pinion planetary gear set, the first rotation element may be a first sun gear, the second rotation element may be a first planet carrier, and the third rotation element may be a first ring gear, the second planetary gear set may be a single pinion planetary gear set, the fourth rotation element may be a second sun gear, the fifth rotation element may be a second planet carrier, and the sixth rotation element may be a second ring gear, the third planetary gear set may be a single pinion planetary gear set, the seventh rotation element may be a third sun gear, the eighth rotation element may be a third planet carrier, and the ninth rotation element may be a third ring gear, and the fourth planetary gear set may be a single pinion planetary gear set, the tenth rotation element may be a fourth sun gear, the eleventh rotation element may be a fourth planet carrier, and the twelfth rotation element may be a fourth ring gear.

The six control elements may include a first clutch selectively connecting the input shaft and the second rotational shaft to each other, a second clutch selectively connecting the input shaft and the eighth rotational shaft to each other, a third clutch selectively connecting the second rotational shaft and the ninth rotational shaft to each other, a fourth clutch selectively connecting the fifth rotational shaft and the ninth rotational shaft to each other, a first brake selectively connecting the second rotational shaft and the transmission housing, and a second brake selectively connecting the sixth rotational shaft and the transmission housing.

Speed shift stages implemented by selectively operating the six control elements may include a forward first-speed shift, implemented by operating the third and the fourth clutches, and the second brake, a forward second-speed shift, implemented by operating the first and third clutches, and the second brake, a forward third-speed shift, implemented by operating the first and fourth clutches, and the second brake, a forward fourth-speed shift, implemented by operating the first and second clutches, and the second brake, a forward fifth-speed shift, implemented by operating the first and the second, and the fourth clutches, a forward sixth-speed shift, implemented by operating the first and the second, and the third clutches, a forward seventh-speed shift, implemented by operating the second and the third, and the fourth clutches, a forward eighth-speed shift, implemented by operating the second and the third clutches, and the first brake, a forward ninth-speed shift, implemented by operating the second and fourth clutches, and the first brake, a reverse-speed shift, implemented by operating the fourth clutch, and the first and second brakes.

According to various aspects of the present invention, a planetary gear train of an automatic transmission for vehicles may include an input shaft receiving power of an engine, an output shaft outputting shifted power, a first planetary gear set comprising a single pinion planetary gear set, and including first and second, and third rotation elements, a second planetary gear set comprising a single pinion planetary gear set, and including fourth, fifth, and sixth rotation elements, a third planetary gear set comprising a single pinion planetary gear set, and including seventh, eighth, and ninth rotation elements, a fourth planetary gear set comprising a single pinion planetary gear set, and including tenth, eleventh, and twelfth rotation elements, a first rotational shaft including the first rotation element and directly connected to the input shaft, a second rotational shaft including the second rotation element and selectively connectable to the transmission housing, a third rotational shaft including the third rotation element and the fifth rotation element, a fourth rotational shaft including the fourth rotation element and directly connected to the transmission housing, a fifth rotational shaft including the sixth rotation element, a sixth rotational shaft including the seventh rotation element and selectively connectable to the transmission housing, a seventh rotational shaft including the eighth rotation element and the twelfth rotation element, and directly connected to the output shaft, an eighth rotational shaft including the ninth rotation element and the eleventh rotation element, and selectively connectable to the input shaft, a ninth rotational shaft including the tenth rotation element, and selectively connectable to at least one of the second rotational shaft and the fifth rotational shaft, a first clutch selectively connecting the input shaft and the second rotational shaft, a second clutch selectively connecting the input shaft and the eighth rotational shaft, a third clutch selectively connecting the second rotational shaft and the ninth rotational shaft, a fourth clutch selectively connecting the fifth rotational shaft and the ninth rotational shaft, a first brake selectively connecting the second rotational shaft and the transmission housing, and a second brake selectively connecting the sixth rotational shaft and the transmission housing.

The first planetary gear set may include the first rotation element as a first sun gear, the second rotation element as a first planet carrier, and the third rotation element as a first ring gear, the second planetary gear set may include the fourth rotation element as a second sun gear, the fifth rotation element as a second planet carrier, and the sixth rotation element as a second ring gear, the third planetary gear set may include the seventh rotation element as a third sun gear, the eighth rotation element as a third planet carrier, and the ninth rotation element as a third ring gear, and the fourth planetary gear set may include the tenth rotation element as a fourth sun gear, the eleventh rotation element as a fourth planet carrier, and the twelfth rotation element as a fourth ring gear.

The planetary gear train according to various embodiments of the present invention may implement the speed shift stages for nine forward speed shifts and one reverse speed shift by combining four planetary gear sets with the six control elements.

In addition, a span of a gear shift ratio is 9.0 or more, thereby maximizing driving efficiency of the engine.

Furthermore, the linearity of the interstage ratio of the shift stage is secured while multi-staging the shift stage at high efficiency, thereby making it possible to improve drivability such as acceleration before and after the shift, an engine speed rhythmic sense, and the like.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figures 1, 2:
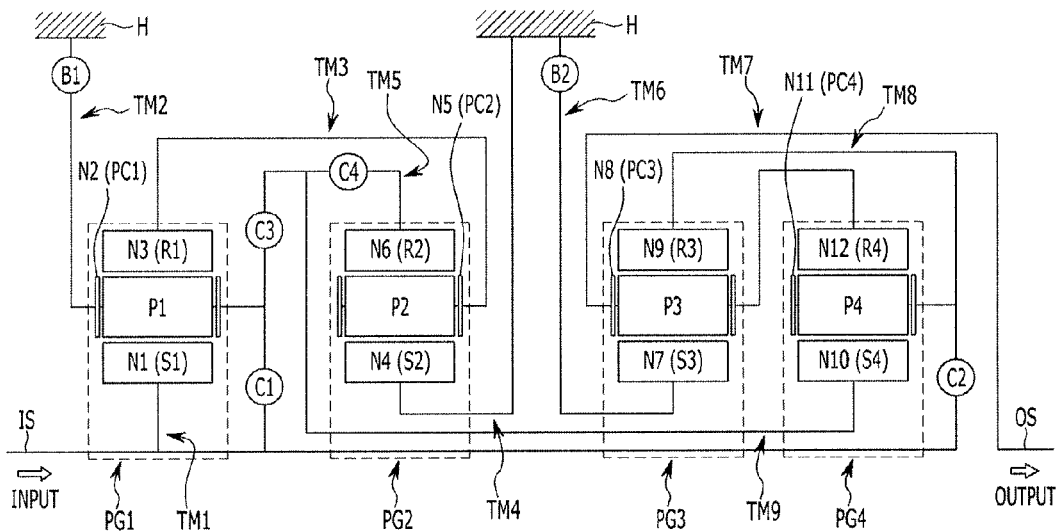
FIG. 1 is a configuration diagram of a planetary gear train according to various embodiments of the present invention.
FIG. 2 is an operation table for each shift stage of each control element which is used for the planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention is configured to include first, second, third, and fourth planetary gear sets PG1, PG2, PG3, and PG4 disposed on the same axis, an input shaft IS, an output shaft OS, nine shafts TM1 to TM9 directly connecting the respective rotation elements of the first, second, third, and fourth planetary gear sets PG1, PG2, PG3, and PG4 to each other, six control elements C1 to C4 and B1 and B2, and a transmission housing H.

In addition, rotation power input from the input shaft IS is shifted by mutual complementing operation between the first, second, third, and fourth planetary gear sets PG1, PG2, PG3, and PG4 and is then output through the output shaft OS.

The respective simple planetary gear sets are disposed in a sequence of the first, second, third, and fourth planetary gear sets PG1, PG2, PG3, and PG4 from an engine side.

The input shaft IS is an input member, and rotation power from a crank shaft of an engine is input to the input shaft after a torque thereof is converted through a torque converter.

The output shaft OS, which is an output member, is disposed on the same axis as an axis on which the input shaft IS is disposed and transfers shifted driving force to a driving shaft through a differential apparatus.

The first planetary gear set PG1, which is a single pinion planetary gear set, includes a first sun gear S1 which is a first rotation element N1, a first planet carrier PC1 which is a second rotation element N2 supporting a first pinion P1 externally engaged with the first sun gear S1 which is the first rotation element N1, and a first ring gear R1 which is a third rotation element N3 internally engaged with the first pinion P1, as the rotation elements.

The second planetary gear set PG2, which is the single pinion planetary gear set, includes a second sun gear S2 which is a fourth rotation element N4, a second planet carrier PC2 which is a fifth rotation element N5 supporting a second pinion P2 externally engaged with the second sun gear S2 which is the fourth rotation element N4, and a second ring gear R2 which is a sixth rotation element N6 internally engaged with the second pinion P2.

The third planetary gear set PG3, which is the single pinion planetary gear set, includes a third sun gear S3 which is a seventh rotation element N7, a third planet carrier PC3 which is an eighth rotation element N8 supporting a third pinion P3 externally engaged with the third sun gear S3 which is the seventh rotation element N7, and a third ring gear R3 which is a ninth rotation element N9 internally engaged with the third pinion P3.

The fourth planetary gear set PG4, which is the single pinion planetary gear set, includes a fourth sun gear S4 which is a tenth rotation element N10, a fourth planet carrier PC4 which is an eleventh rotation element N11 supporting a fourth pinion P4 externally engaged with the fourth sun gear S4 which is the tenth rotation element N10, and a fourth ring gear R4 which is a twelfth rotation element N12 internally engaged with the fourth pinion P4.

The second rotation element N2 is directly connected to the eleventh rotation element N11, the third rotation element N3 is directly connected to the seventh rotation element N7, the sixth rotation element N6 is directly connected to the tenth rotation element N10, such that the first, second, third, and fourth planetary gear sets PG1, PG2, PG3, and PG4 are operated while maintaining a total of nine rotational shafts TM1 to TM9.

Configurations of the nine rotational shafts TM1 to TM9 will be described below.

The first rotational shaft TM1 is configured to include the first rotation element N1 (first sun gear S1), and is directly connected to the input shaft IS in order to operate as a input element at all time.

The second rotational shaft TM2 is configured to include the second rotation element N2 (first planet carrier PC1), and is selectively connectable to the first rotational shaft TM1 as a selective input element and is selectively connectable to the transmission housing H at the same time as a fixed element.

The third rotational shaft TM3 is configured to include the third rotation element N3 (first ring gear R1) and the fifth rotation element N5 (second planet carrier PC2).

The fourth rotational shaft TM4 is configured to include the fourth rotation element N4 (second sun gear N2), and is directly connected to the transmission housing H and is operated as a fixed element at all time.

The fifth rotational shaft TM5 is configured to include the sixth rotation element N6 (second ring gear R2).

The sixth rotational shaft TM6 is configured to include the seventh rotation element N7 (the sun gear S3), and is selectively connectable to the transmission housing H and is operated as a selective fixed element.

The seventh rotational shaft TM7 is configured to include the eighth rotation element N8 (third planet carrier PC3) and the twelfth rotation element N12 (fourth ring gear R4), and is directly connected to the output shaft OS and is operated as an output element at all time.

The eighth rotational shaft TM8 is configured to include the ninth rotation element N9 (third ring gear R3) and the eleventh rotation element N11 (fourth planet carrier PC4), and selectively connectable to the input shaft IS (first rotational shaft TM1) and is operated as a selective input element.

The ninth rotational shaft TM9 is configured to include the tenth rotation element N10 (fourth sun gear S4), and is selectively connectable to the second rotational shaft TM2 or the fifth rotational shaft TM5.

In addition, four clutches C1, C2, C3, and C4, which are control elements, are disposed at portions to which the rotational shafts are selectively connectable to each other, of the rotational shafts TM1 to TM9.

In addition, two brakes B1 and B2, which are control elements, are disposed at portions of the rotation shafts TM1 to TM9 which are selectively connectable to the transmission housing H.

Disposed positions of the six control elements C1 to C4 and B1 to B2 will be described below.

The first clutch C1 is disposed between the input shaft IS (first rotational shaft TM1) and the second rotational shaft TM2 to allow the input shaft IS (first rotational shaft TM1) and the second rotational shaft TM2 to be selectively integrated with each other.

The second clutch C2 is disposed between the input shaft IS (first rotational shaft TM1) and the eighth rotational shaft TM8 to allow the input shaft IS (first rotational shaft TM1) and the eighth rotational shaft TM8 to be selectively integrated with each other.

The third clutch C3 is interposed between the second rotational shaft TM2 and the ninth rotational shaft TM9 to allow the second rotational shaft TM2 or the ninth rotational shaft TM9 to be selectively integrated with each other.

The fourth clutch C4 is interposed between the fifth rotational shaft TM5 and the ninth rotational shaft TM9 to allow the fifth rotational shaft TM5 and the ninth rotational shaft TM9 to be selectively integrated with each other.

The first brake B1 is interposed between the second rotational shaft TM2 and the transmission housing H to allow the second rotational shaft TM2 to be operated as a selective fixed element.

The second brake B2 is interposed between the sixth rotational shaft TM6 and the transmission housing H to allow the sixth rotational shaft TM6 to be operated as a selective fixed element.

The respective control elements including the first, second, third, and fourth clutches C1, C2, C3, and C4, and the first and second brakes B1, B2 may be formed of a multi-plate type hydraulic friction coupling unit which is frictionally coupled by hydraulic pressure.

FIG. 2 is an operation table for each shift stage of each control element which is used for the planetary gear train according to various embodiments of the present invention.

As shown in FIG. 2, the planetary gear train according to various embodiments of the present invention is shifted while three control elements are operated in each shift stage.

In a forward 1-speed shift stage D1, the third and the fourth clutches C3, C4 and the second brake B2 are operated. Thus, in a state in which the second rotational shaft TM2 and the ninth rotational shaft TM9 are connected to each other by the operation of the third clutch C3, and the fifth rotational shaft TM5 and the ninth rotational shaft TM9 are connected to each other by the operation of the fifth clutch C5, the input is performed through the first rotational shaft TM1. And, in a state in which the fourth rotational shaft TM4 is operated as a fixed element at all time, and the sixth rotational shaft TM6 is operated as a fixed element through the operation of the second brake B2, the planetary gear train becomes the forward 1-speed by cooperation of the each rotational shafts and outputs through the output shaft OS including the seventh rotational shaft TM7.

In a forward 2-speed shift stage D2, the first and third clutch C1 and C3, and second brake B2 are operated. Thus, in a state in which the input shaft IS (first rotational shaft TM1) and the second rotational shaft TM2 are connected to each other by the operation of the first clutch C1, and the second rotational shaft TM2 and the ninth rotational shaft TM9 are connected each other by the operation of the third clutch C2, the input is simultaneously performed through the first rotational shaft TM1 and the second rotational shaft TM2. In addition, in a state in which the fourth rotational shaft TM4 is operated as a fixed element at all time, and the sixth rotational shaft TM6 is operated as a fixed element by the operation of the second brake B2, the planetary gear train becomes the forward 2-speed by cooperation of the each rotational shafts and outputs through the output shaft OS including the seventh rotational shaft TM7.

In a forward 3-speed shift stage D3, the first and fourth clutch C1 and C4, and second brake B2 are operated. Thus, in a state in which the input shaft IS (first rotational shaft TM1) and the second rotational shaft TM2 are connected to each other by operation of the first clutch C1, and the fifth rotational shaft TM5 and the ninth rotational shaft TM9 are connected to each other by operation of the fourth clutch C4, the input is simultaneously performed through the first rotational shaft TM1 and the second rotational shaft TM2. In addition, in a state in which the fourth rotational shaft TM4 is operated as a fixed element at all time, and the sixth rotational shaft TM6 is operated as a fixed element by the operation of the second brake B2, the planetary gear train becomes the forward 3-speed by cooperation of the each rotational shafts and outputs through the output shaft OS including the seventh rotational shaft TM7.

In a forward 4-speed shift stage D4, the first and second clutch C1 and C2, and the second brake B2 are operated.

Thus, in a state in which the input shaft IS (first rotational shaft TM1) and the second rotational shaft TM2 are connected to each other by operation of the first clutch C1, and the input shaft IS (first rotational shaft TM1) and the eighth rotational shaft TM8 are connected to each other by operation of the second clutch C2, the input is simultaneously performed through the first, second, eighth rotational shafts TM1, TM2, and TM3.

In addition, in a state in which the fourth rotational shaft TM4 is operated as a fixed element at all time, and the sixth rotational shaft TM6 is operated as a fixed element by the operation of the second brake B2, the planetary gear train becomes the forward 4-speed by cooperation of the each rotational shafts and outputs through the output shaft OS including the seventh rotational shaft TM7.

In a forward 5-speed shift stage D5, the first and second, and fourth clutch C1 and C2, and C4 are operated. Thus, in a state in which the input shaft IS (first rotational shaft TM1) and the second rotational shaft TM2 are connected to each other by operation of the first clutch C1, and the input shaft IS (first rotational shaft TM1) and the eighth rotational shaft TM8 by operation of the second clutch C2, the fifth rotational shaft TM5 and the ninth rotational shaft TM9 are connected to each other by operation of the fourth clutch C4, the input is simultaneously performed through the first, second, and eighth rotational shaft TM1, TM2, and TM8. In addition, in a state in which the fourth rotational shaft TM4 is operated as a fixed element at all time, the planetary gear train becomes the forward 5-speed by cooperation of the each rotational shafts and outputs through the output shaft OS including the seventh rotational shaft TM7.

In a forward 6-speed shift stage D6, the first and second clutch, and the third clutches C1 and C2, and C3 are operated. Thus, in a state in which the input shaft IS (first rotational shaft TM1) and the second rotational shaft TM2 are connected to each other by operation of the first clutch C1, and the input shaft IS (first rotational shaft TM1) and the eighth rotational shaft TM8 by operation of the second clutch C2, the second rotational shaft TM2 and the ninth rotational shaft TM9 are connected to each other by operation of the third clutch C3, the input is simultaneously performed through the first, second, eighth, and ninth rotational shafts TM1, TM2, TM8, and TM9. In addition, in a state in which the fourth rotational shaft TM4 is operated as a fixed element at all time, the planetary gear train becomes the forward 6-speed and outputs through the output shaft OS including the seventh rotational shaft TM7 such that PG1, PG3, and PG4 are directly connected which outputs the inputted power as it is, is carried out.

In a forward 7-speed shift stage D7, the second, third, and fourth clutch C2, C3, and C4 clutches are operated. Thus, in a state in which the input shaft IS (first rotational shaft TM1) and the eighth rotational shaft TM8 are connected to each other by operation of the second clutch C2, the second rotational shaft TM2 and the ninth rotational shaft TM9 are connected to each other by operation of the third clutch C3, the fifth rotational shaft TM5 and the ninth rotational shaft TM9 are connected to each other by operation of the fourth clutch C4, the input is simultaneously performed through the first and eighth rotational shafts TM1 and TM8 at the same time. In addition, in a state in which the fourth rotational shaft TM4 is operated as a fixed element at all time, the planetary gear train becomes the forward 7-speed by cooperation of the each rotational shafts and outputs through the output shaft OS including the seventh rotational shaft TM7.

In a forward 8-speed shift stage D8, the second and third clutches C2 and C3 are operated. Thus, in a state in which the input shaft IS (first rotational shaft TM1) and the eight rotational shaft TM8 are connected to each other by operation of the second clutch C2, and the second rotational shaft TM2 and the ninth rotational shaft TM9 are connected to each other by operation of the third clutch C3, the input is simultaneously performed through the first and eighth rotational shafts TM1 and TM8. In addition, in a state in which the fourth rotational shaft TM4 is operated as a fixed element at all time, and the second rotational shaft TM2 is operated as a fixed element such as the TM4 by operation of the first brake B1, the planetary gear train becomes the forward 8-speed by cooperation of the each rotational shafts and outputs through the output shaft OS including the seventh rotational shaft TM7.

In a forward 9-speed shift stage D6, the second and fourth clutch C2 and C4, and the first brake B1 are operated. Thus, in a state in which the input shaft IS (first rotational shaft TM1) and the eighth rotational shaft TM8 are connected to each other by operation of the second clutch C2, the fifth rotational shaft TM5 and the ninth rotational shaft TM9 are connected to each other by operation of the fourth clutch C4, the input is simultaneously performed through the first and eighth rotational shafts TM1 and TM8. In addition, in a state in which the fourth rotational shaft TM4 is operated as a fixed element at all time, the planetary gear train becomes the forward 8-speed by cooperation of the each rotational shafts and outputs through the output shaft OS including the seventh rotational shaft TM7 while the second rotational shaft TM2 is operated as a fixed element by operation of the first brake B1.

In a reverse-speed shift stage REV, the fourth clutch C4, and the first and the second brake B1 and B2 are operated. According to this, as the fifth rotational shaft TM5 is connected to the ninth rotational shaft TM9 by operation of the fourth clutch C4, torque of the input shaft IS is input to first rotational shaft TM1. Then, as the fourth rotational shaft TM4 is operated as a fixed element, the second and sixth rotational shaft TM2 and TM6 is operated as a fixed element by first and second brake B1 and B2, and torque input is changed by cooperation of the each rotation shaft to be a reverse speed stage and the changed torque is output through the output shaft OS including the seventh rotation shaft TM7.

The planetary gear train according to various embodiments of the present invention may achieve at least nine forward speed shift stages and one reverse speed stage by controlling four planetary gear sets PG1, PG2, PG3, and PG4 with four clutches C1, C2, C3, and C4 and two brakes B1 and B2.

In addition, a span of a gear shift ratio is 9.0 or more, thereby maximizing driving efficiency of the engine is achieved.

In addition, all ratios between the gear shift stages are 1.2 or more except for 6/7, 7/8 forward gear shift stages, while ensuring linearity, thereby improving drivability such as acceleration before and after the gear shift operations, and a sense of rhythm of an engine speed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
   an input shaft receiving power from an engine;
   an output shaft outputting shifted power of the engine;
   a first planetary gear set including first, second, and third rotating elements;
   a second planetary gear set including fourth, fifth, and sixth rotating elements;
   a third planetary gear set including seventh, eighth, and ninth rotating elements;
   a fourth planetary gear set including tenth, eleventh, and twelfth rotating elements; and
   six control elements disposed at positions where at least one of the first, second, third, fourth, fifth, sixth, seventh, eighth, ninth, tenth, eleventh, and twelfth rotating elements is selectively connectable with another of the first, second, third, fourth, fifth, sixth, seventh, eighth, ninth, tenth, eleventh, and twelfth rotating elements or disposed at positions where at least one of the first, second, third, fourth, fifth, sixth, seventh, eighth, ninth, tenth, eleventh, and twelfth rotating elements is selectively connectable to a transmission housing, wherein the input shaft is directly connected to the first rotation element, wherein the output shaft is directly connected to the eighth rotation element, wherein the third rotation element is directly connected to the fifth rotation element, wherein the fourth rotation element is directly connected to the transmission housing, wherein the eighth rotation element is directly connected to the twelfth rotation element, wherein the ninth rotation element is directly connected to the eleventh rotation element, wherein at least one of the second rotation element and the seventh rotation element are selectively connectable to the transmission housing, wherein the second rotation element is selectively connectable to the input shaft, wherein the eleventh rotation element is selectively connectable to the input shaft, wherein the second rotation element is selectively connectable to the tenth rotation element, and wherein the sixth rotation element is selectively connectable to the tenth rotation element.

2. The planetary gear train of claim 1, wherein:
the first, second, and third rotation elements comprise a sun gear, a planet carrier, and a ring gear, respectively;
the fourth, fifth, and sixth rotation elements comprise a sun gear, a planet carrier, and a ring gear, respectively;
the seventh, eighth, and ninth rotation elements comprise a sun gear, a planet carrier, and a ring gear, respectively; and
the tenth, eleventh, and twelfth rotation elements comprise a sun gear, a planet carrier, and a ring gear, respectively.

3. A planetary gear train of an automatic transmission for vehicles, the planetary gear train comprising:
an input shaft receiving power of an engine;
an output shaft outputting shifted power of the engine;
a first planetary gear set having first, second, and third rotation elements;
a second planetary gear set having fourth, fifth, and sixth rotation elements;
a third planetary gear set having seventh, eighth, and ninth rotation elements;
a fourth planetary gear set having tenth, eleventh, and twelfth rotation elements;
six control elements disposed at positions to selectively connect the first, second, third, fourth, fifth, sixth, seventh, eighth, ninth, tenth, eleventh, and twelfth rotation elements or at positions to selectively connect at least one of the first, second, third, fourth, fifth, sixth, seventh, eighth, ninth, tenth, eleventh, and twelfth rotation elements and a transmission housing;
a first rotational shaft including the first rotation element and directly connected to the input shaft;
a second rotational shaft including the second rotation element and selectively connectable to the transmission housing;
a third rotational shaft including the third rotation element and the fifth rotation element;
a fourth rotational shaft including the fourth rotation element and directly connected to the transmission housing;
a fifth rotational shaft including the sixth rotation element;
a sixth rotational shaft including the seventh rotation element and selectively connectable to the transmission housing;
a seventh rotational shaft including the eighth rotation element and the twelfth rotation element, and directly connected to the output shaft;
an eighth rotational shaft including the ninth rotation element and the eleventh rotation element, and selectively connectable to the input shaft; and
a ninth rotational shaft including the tenth rotation element, and selectively connectable to at least one of the second rotational shaft and the fifth rotational shaft, wherein the first planetary gear set comprises a single pinion planetary gear set, the first rotation element is a first sun gear, the second rotation element is a first planet carrier, and the third rotation element is a first ring gear, wherein the second planetary gear set comprises a single pinion planetary gear set, the fourth rotation element is a second sun gear, the fifth rotation element is a second planet carrier, and the sixth rotation element is a second ring gear, wherein the third planetary gear set comprises a single pinion planetary gear set, the seventh rotation element is a third sun gear, the eighth rotation element is a third planet carrier, and the ninth rotation element is a third ring gear, and wherein the fourth planetary gear set comprises a single pinion planetary gear set, the tenth rotation element is a fourth sun gear, the eleventh rotation element is a fourth planet carrier, and the twelfth rotation element is a fourth ring gear.

4. The planetary gear train of claim 3, wherein the six control elements include:
a first clutch selectively connecting the input shaft and the second rotational shaft to each other;
a second clutch selectively connecting the input shaft and the eighth rotational shaft to each other;
a third clutch selectively connecting the second rotational shaft and the ninth rotational shaft to each other;
a fourth clutch selectively connecting the fifth rotational shaft and the ninth rotational shaft to each other;
a first brake selectively connecting the second rotational shaft and the transmission housing; and
a second brake selectively connecting the sixth rotational shaft and the transmission housing.

5. The planetary gear train of claim 4, wherein speed shift stages implemented by selectively operating the six control elements, include:
a forward first-speed shift, implemented by operating the third and the fourth clutches, and the second brake;
a forward second-speed shift, implemented by operating the first and third clutches, and the second brake;
a forward third-speed shift, implemented by operating the first and fourth clutches, and the second brake;
a forward fourth-speed shift, implemented by operating the first and second clutches, and the second brake;
a forward fifth-speed shift, implemented by operating the first and the second, and the fourth clutches;
a forward sixth-speed shift, implemented by operating the first and the second, and the third clutches;
a forward seventh-speed shift, implemented by operating the second and the third, and the fourth clutches;

a forward eighth-speed shift, implemented by operating the second and the third clutches, and the first brake;
a forward ninth-speed shift, implemented by operating the second and fourth clutches, and the first brake;
a reverse-speed shift, implemented by operating the fourth clutch, and the first and second brakes.

6. A planetary gear train of an automatic transmission for vehicles, the planetary gear train comprising:
an input shaft receiving power of an engine;
an output shaft outputting shifted power;
a first planetary gear set comprising a single pinion planetary gear set, and including first, and second, and third rotation elements;
a second planetary gear set comprising a single pinion planetary gear set, and including fourth, fifth, and sixth rotation elements;
a third planetary gear set comprising a single pinion planetary gear set, and including seventh, eighth, and ninth rotation elements;
a fourth planetary gear set comprising a single pinion planetary gear set, and including tenth, eleventh, and twelfth rotation elements;
a first rotational shaft including the first rotation element and directly connected to the input shaft;
a second rotational shaft including the second rotation element and selectively connectable to a transmission housing;
a third rotational shaft including the third rotation element and the fifth rotation element;
a fourth rotational shaft including the fourth rotation element and directly connected to the transmission housing;
a fifth rotational shaft including the sixth rotation element;
a sixth rotational shaft including the seventh rotation element and selectively connectable to the transmission housing;
a seventh rotational shaft including the eighth rotation element and the twelfth rotation element, and directly connected to the output shaft;
an eighth rotational shaft including the ninth rotation element and the eleventh rotation element, and selectively connectable to the input shaft;
a ninth rotational shaft including the tenth rotation element, and selectively connectable to at least one of the second rotational shaft and the fifth rotational shaft;
a first clutch selectively connecting the input shaft and the second rotational shaft;
a second clutch selectively connecting the input shaft and the eighth rotational shaft;
a third clutch selectively connecting the second rotational shaft and the ninth rotational shaft;
a fourth clutch selectively connecting the fifth rotational shaft and the ninth rotational shaft;
a first brake selectively connecting the second rotational shaft and the transmission housing; and
a second brake selectively connecting the sixth rotational shaft and the transmission housing.

7. The planetary gear train of claim 6, wherein:
the first planetary gear set includes the first rotation element comprising a first sun gear, the second rotation element comprising a first planet carrier, and the third rotation element comprising a first ring gear;
the second planetary gear set includes the fourth rotation element comprising a second sun gear, the fifth rotation element comprising a second planet carrier, and the sixth rotation element comprising a second ring gear;
the third planetary gear set includes the seventh rotation element comprising a third sun gear, the eighth rotation element comprising a third planet carrier, and the ninth rotation element comprising a third ring gear; and
the fourth planetary gear set includes the tenth rotation element comprising a fourth sun gear, the eleventh rotation element comprising a fourth planet carrier, and the twelfth rotation element comprising a fourth ring gear.

8. The planetary gear train of claim 6, wherein speed shift stages implemented by selectively operating the four clutches and the two brakes, include:
a forward first-speed shift, implemented by operating the third and the fourth clutches, and the second brake;
a forward second-speed shift, implemented by operating the first and third clutches, and the second brake;
a forward third-speed shift, implemented by operating the first and fourth clutches, and the second brake;
a forward fourth-speed shift, implemented by operating the first and second clutches, and the second brake;
a forward fifth-speed shift, implemented by operating the first and the second, and the fourth clutches;
a forward sixth-speed shift, implemented by operating the first and the second, and the third clutches;
a forward seventh-speed shift, implemented by operating the second and the third, and the fourth clutches;
a forward eighth-speed shift, implemented by operating the second and the third clutches, and the first brake;
a forward ninth-speed shift, implemented by operating the second and fourth clutches, and the first brake;
a reverse-speed shift, implemented by operating the fourth clutch, and the first and second brakes.

* * * * *